(12) United States Patent
Bhaduri et al.

(10) Patent No.: US 8,815,184 B2
(45) Date of Patent: Aug. 26, 2014

(54) PROCESS FOR SEPARATING AND RECOVERING METALS

(75) Inventors: Rahul Shankar Bhaduri, Moraga, CA (US); Louis Joseph Nordrum, Corte Madera, CA (US); Alexander E Kuperman, Orinda, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 467 days.

(21) Appl. No.: 13/156,589

(22) Filed: Jun. 9, 2011

(65) Prior Publication Data

US 2012/0039777 A1 Feb. 16, 2012

Related U.S. Application Data

(60) Provisional application No. 61/374,171, filed on Aug. 16, 2010.

(51) Int. Cl.
*C01G 37/14* (2006.01)

(52) U.S. Cl.
USPC ............................................. 423/58; 423/55

(58) Field of Classification Search
USPC .................... 423/56, 55, 67, 68, 40
See application file for complete search history.

(56) References Cited

U.S. PATENT DOCUMENTS

| | | |
|---|---|---|
| 3,455,677 A | 7/1969 | Litz |
| 3,647,361 A | 3/1972 | Coltrinari et al. |
| 3,763,303 A | 10/1973 | Khuri et al. |
| 3,886,259 A | 5/1975 | Nikolai, Jr. et al. |
| 3,903,241 A | 9/1975 | Stevens et al. |
| 4,131,455 A | 12/1978 | Edwards et al. |
| 4,145,397 A | 3/1979 | Toida et al. |
| 4,216,118 A | 8/1980 | Yoshida et al. |
| 4,220,634 A | 9/1980 | Deschamps et al. |
| 4,374,100 A | 2/1983 | Sebenik et al. |
| 4,409,190 A | 10/1983 | Van Leirsburg |
| 4,417,972 A | 11/1983 | Francis et al. |
| 4,432,953 A | 2/1984 | Hubred et al. |
| 4,434,043 A | 2/1984 | Singhal et al. |
| 4,500,495 A | 2/1985 | Hubred et al. |
| 4,541,868 A | 9/1985 | Lowenhaupt et al. |

(Continued)

OTHER PUBLICATIONS

Costello, Acid Mine Drainage: Innovative Treatment Technologies, Oct. 2003, National Network for Environmental Management Studies (NMEMS) Program.

(Continued)

*Primary Examiner* — Melvin Curtis Mayes
*Assistant Examiner* — Melissa Stalder

(57) ABSTRACT

A process for treating spent catalyst containing heavy metals, e.g., Group VIB metals and Group VIII metals is provided. In one embodiment after deoiling, the spent catalyst is treated with an ammonia leach solution under conditions sufficient to dissolve the group VIB metal and the Group VIII metal into the leaching solution, forming a leach slurry. After solid-liquid separation to recover a leach solution, chemical precipitation and solids repulping is carried out to obtain an effluent stream containing ammonium sulfate (Amsul), ammonium sulfamate, Group VB, Group VIB and Group VIII metals. Following sulfidation, the Group VIII metal is fully removed and Group VB and Group VI metals are partially removed from the Amsul stream. In the additional steps of oxydrolysis and iron precipitation, an effective amount of ferric ion at a pre-select pH is added to form insoluble complexes with the Group VB and Group VIB metals, which upon liquid-solid separation produces an effluent ammonium sulfate stream containing less than 10 ppm each of the Group VB and Group VIB metals.

29 Claims, 2 Drawing Sheets

(56) References Cited

U.S. PATENT DOCUMENTS

| | | | |
|---|---|---|---|
| 4,548,700 A | 10/1985 | Bearden, Jr. et al. |
| 4,554,138 A | 11/1985 | Marcantonio |
| 4,661,265 A | 4/1987 | Olson et al. |
| 4,695,378 A | 9/1987 | Ackman et al. |
| 4,762,812 A | 8/1988 | Lopez et al. |
| 4,832,925 A | 5/1989 | Weir et al. |
| 4,861,565 A | 8/1989 | Sefton et al. |
| 4,900,522 A | 2/1990 | Chou et al. |
| 4,950,407 A | 8/1990 | Stahl |
| 5,099,047 A | 3/1992 | Sato et al. |
| 5,171,454 A | 12/1992 | Bockowski et al. |
| 5,246,570 A | 9/1993 | Cronauer et al. |
| 5,415,849 A | 5/1995 | Toyabe et al. |
| 5,457,258 A | 10/1995 | Hommeltoft et al. |
| 5,482,632 A | 1/1996 | Lomasney et al. |
| 5,505,857 A | 4/1996 | Misra et al. |
| 5,536,416 A | 7/1996 | Coltrinari et al. |
| 5,550,141 A | 8/1996 | Gould et al. |
| 5,573,556 A | 11/1996 | Wen |
| 5,587,001 A | 12/1996 | De Vries |
| 5,616,251 A | 4/1997 | Batarseh |
| 5,645,730 A | 7/1997 | Malachosky et al. |
| 5,766,478 A | 6/1998 | Smith et al. |
| 6,001,185 A | 12/1999 | Huff |
| 6,086,847 A | 7/2000 | Thompson |
| 6,153,155 A | 11/2000 | Wen et al. |
| 6,180,072 B1 | 1/2001 | Veal et al. |
| 6,586,600 B2 | 7/2003 | Atwood et al. |
| 6,589,492 B2 | 7/2003 | Matsumoto et al. |
| 6,673,732 B2 | 1/2004 | Muhler et al. |
| 6,733,564 B1 | 5/2004 | Sahu et al. |
| 6,790,352 B1 | 9/2004 | Wurzburger et al. |
| 6,923,914 B2 | 8/2005 | Perriello |
| 6,932,909 B2 | 8/2005 | Rey |
| 6,991,405 B2 | 1/2006 | Barrie et al. |
| 7,008,606 B2 | 3/2006 | Misra et al. |
| 7,033,480 B2 | 4/2006 | King |
| 7,067,090 B2 | 6/2006 | Han et al. |
| 7,101,429 B2 | 9/2006 | Brown |
| 7,153,541 B2 | 12/2006 | Elsetinow et al. |
| 7,182,926 B2 | 2/2007 | Akahoshi |
| 7,247,291 B2 | 7/2007 | Sreeram et al. |
| 7,255,795 B2 | 8/2007 | Sentimenti et al. |
| 7,294,275 B1 | 11/2007 | Sibrell |
| 7,311,786 B2 | 12/2007 | Fuerstenau et al. |
| 7,455,715 B2 | 11/2008 | Harlamovs et al. |
| 7,491,322 B1 | 2/2009 | Sibrell |
| 7,658,895 B2 | 2/2010 | Bhaduri |
| 7,704,470 B2 | 4/2010 | Haydock |
| 7,784,620 B2 | 8/2010 | Sharkey, Jr. et al. |
| 7,837,960 B2 | 11/2010 | Bhaduri et al. |
| 7,846,404 B2 | 12/2010 | Bhaduri et al. |
| 2002/0100732 A1 | 8/2002 | Atwood et al. |
| 2003/0062306 A1 | 4/2003 | Perriello |
| 2003/0089201 A1 | 5/2003 | Harlamovs et al. |
| 2003/0130118 A1 | 7/2003 | Koyama et al. |
| 2003/0132166 A1 | 7/2003 | Rey |
| 2004/0067107 A1 | 4/2004 | Barrie et al. |
| 2004/0219082 A1 | 11/2004 | Matjie et al. |
| 2004/0237720 A1 | 12/2004 | Moyes et al. |
| 2004/0241066 A1 | 12/2004 | Jasra et al. |
| 2005/0036930 A1 | 2/2005 | Elsetinow et al. |
| 2005/0103402 A1 | 5/2005 | Fuerstenau et al. |
| 2005/0118081 A1 | 6/2005 | Harris et al. |
| 2005/0249652 A1 | 11/2005 | Scharifker et al. |
| 2006/0051875 A1 | 3/2006 | Reppy et al. |
| 2006/0135631 A1 | 6/2006 | Kopponen et al. |
| 2006/0151399 A1 | 7/2006 | Brandts et al. |
| 2006/0258531 A1 | 11/2006 | Koyama et al. |
| 2007/0010701 A1 | 1/2007 | Forrester |
| 2007/0025899 A1 | 2/2007 | Marcantonio |
| 2007/0045189 A1 | 3/2007 | Lichtner et al. |
| 2007/0098609 A1 | 5/2007 | McConnell |
| 2007/0131143 A1 | 6/2007 | Sreeram et al. |
| 2007/0144944 A1 | 6/2007 | Del Bianco et al. |
| 2007/0193413 A9 | 8/2007 | Harlamovs et al. |
| 2008/0221379 A1 | 9/2008 | Barnes |
| 2009/0114606 A1 | 5/2009 | Sharkey, Jr. et al. |
| 2010/0140107 A1 | 6/2010 | Sloan |
| 2010/0187130 A1 | 7/2010 | Smith et al. |
| 2010/0282686 A1 | 11/2010 | Sharkey, Jr. et al. |
| 2010/0307972 A1 | 12/2010 | Bratty et al. |
| 2010/0329790 A1 | 12/2010 | Jin et al. |

OTHER PUBLICATIONS

Fripp, Acid Mine Drainage Treatment, May 2000, U.S. Army Corps of Engineers Ecosystem Management and Restoration Research Program.

Kleinmann, Acid Water Treatment Using Engineered Wetlands, 2006, Int'l Mine Water Association.

Mendez-Ortiz, Acide rock drainage and metal leaching from mine waste material (tailings) of a Pb—Zn—Ag skarn deposit: environmental assessment through static and kinetic laboratory tests, 2007, Revista Mexicana de Ciencias Geologicas.

Ludington, Climax MO Deposits, 1986.

Chartrand, Electrochemical remediation of acid mine drainage, 2003, Kluwer Academic Publishers.

Morrison, Extraction of Uranium and Molybdenum from Aqueous Solutions: A Survey of Industrial Materials for Use in Chemical Barriers for Uranium Mill Tailings Remediation, 1992, American Chemical Society.

Kirby, Field determination of $Fe^2$ oxidation rates in acid mine drainage using a continuously-stirred tank reactor, 1998, Elsevier Science Ltd.

Gemici, Impact of Acid Mine Drainage from the Abandoned Haliköy Mercury Mine (Western Turkey) on Surface and Groundwaters, 2004 Springer-Verlag New York, Bulletin Environmental Contamination and Toxicology.

Morais, Impact of acid mine drainage from Tinoca Mine on the Abrilongo dam (southeast Portugal), Feb. 2008, Mineralogical Magazine, 2008 The Mineralogical Society.

Denimal, Leaching of coal-mine tips (Nord-Pas-de_Calais coal basin, France) and sulphate transfer to the chalk aquifer: example of acid mine drainage in a buffered environment, Jun. 22, 2002, Springer-Verlag 2002, Environmental Geology (2002).

U.S. Environmental Protection Agency, Molycorp, Inc. Site Proposed Cleanup Plan Dec. 2009, The New Mexico Environment Department (NMED).

Cravotta, Limestone drains to increase pH and remove dissolved metals from acidic mine drainage, 1999, Applied Geochemistry, 1999 Elseiver Science Ltd.

Pérez-López, Neutralization of acid mine drainage using the final product from $CO_2$ emissions capture with alkaline paper mill waste, Journal of Hazardous Materials 2010, 2009 Elsevier B.V.

Zipper, Passive Treatment of Acid-Mine Drainage, 2009, Virginia Cooperative Extension Publication No. 460-133.

Simmons, Phosphorus Removal by Sediment in Streams Contaminated with Acid Mine Drainage, 2009 Springer Science + Business Media B.V., Water Air Soil Pollution (2010).

Mohan, Removal and recovery of metal ions from acid mine drainage using lignite—A low cost sorbent, Journal of Hazardous Materials (2006).

Wang, Removal of Arsenic from Synthetic Acid Mine Drainage by Electrochemical pH Adjustment and Coprecipitation with Iron Hydroxide, Nov. 19, 2003, Environmental Science & Technology.

Singh, Removal of Trace Elements from Acid Mine Drainage, 1985, International Journal of Mine Water.

Review of Existing and Proposed Tailings Impoundment Technologies, Sep. 25, 2008, U.S. Environmental Protection Agency.

(56) References Cited

OTHER PUBLICATIONS

Faulkner, The Largest Acid Mine Drainage Treatment Plant in the World?, Apr. 19-20, 2005, 26$^{th}$ West Virginia Surface Mine Drainage Task Force.

Clyde, The use of passive treatment alternatives for the mitigation of acidic drainage at the Williams Brother mine, California: Bench-scale study, 2010, Applied Geochemistry, Elsevier Ltd.

Prasad, Treatment of Acid Mine Drainage Using Fly Ash Zeolite, Oct. 20, 2010, Water Air Soil Pollution, School of Earth and Environment, University of Leeds, Springer Science+Business Media B.V.

Sahinkaya, Sulfidogenic fluidized bed treatment of real acid mine drainage water, Bioresource Technology, 2010 Elseiver Ltd.

L.Carlson, Scavenging of As from Acid Mine Drainage by Schwertmannite and Ferrihydrite: A Comparison with Synthetic Analogues, Mar. 7, 2002, Environmental Science & Technology.

US 8,815,184 B2

PROCESS FOR SEPARATING AND RECOVERING METALS

CROSS-REFERENCE TO RELATED APPLICATIONS

This application claims benefit under 35 USC 119 of U.S. Provisional Patent Application No. 61/374,171 with a filing date of Aug. 16, 2010. This application claims priority to and benefits from the foregoing, the disclosure of which is incorporated herein by reference.

TECHNICAL FIELD

The invention relates to a process for separating and recovering metals from spent hydroprocessing catalyst.

BACKGROUND

Catalysts have been used widely in the refining and chemical processing industries for many years. Hydroprocessing catalysts, including hydrotreating and hydrocracking catalysts, are now widely employed in facilities worldwide. After being used for hydroprocessing, used or "spent" hydroprocessing catalysts typically contain metal components such as molybdenum, nickel, cobalt, vanadium, and the like.

With the advent of heavier crude feedstock, refiners are forced to use more catalysts than before for hydroprocessing and to remove catalyst contaminants and sulfur from the feedstock. These catalytic processes generate quantities of spent catalyst. With the increasing demand and market price for metal values and environmental awareness thereof, catalysts can serve as a source for metal recovery.

In order to recycle catalytic metals and provide a renewable source for the metals, efforts have been made to selectively extract metals from mixtures. It has been reported by Yatirajam et al. of Kurukshetra University, India (1972), among other sources including U.S. Pat. No. 7,255,795, that molybdenum (Mo) can be selectively extracted as molybdenum xanthate from other metal elements, including vanadium, from liquid mixtures by potassium ethyl xanthate at an acidic pH with the use of agents such as hydrochloric acid. US Patent Publication No. 2007/0025899 discloses a process to recover metals such as molybdenum, nickel, and vanadium from a spent catalyst with a plurality of steps and equipment to recover the molybdenum and nickel metal complexes. U.S. Pat. No. 6,180,072 discloses another complex process requiring oxidation steps and solvent extraction to recover metals from spent catalysts containing at least a metal sulphide. U.S. Pat. No. 7,846,404 discloses a process using pH adjustment and precipitation, for recovery of metals from ammoniacal pressure leach solution generated through oxidative pressure leaching of spent catalyst.

There is still a need for improved methods to recover metals including but not limited to molybdenum, nickel, and vanadium from spent catalysts. In one embodiment, the invention relates to a method for recovering Group VIB metals from a pressure leach solution in a process to recover metals from spent catalyst.

SUMMARY

In one aspect, the invention relates to a method of recovering metals from a spent catalyst, comprising: leaching a Group VIB metal, a Group VIII metal, and a Group VB metal, with an ammonia containing leach solution at a temperature and a pressure sufficient to dissolve the metals and form a pressure leach slurry; separating and removing the solid coke residue containing most of the Group VB metal from the pressure leach slurry to form a pressure leach solution comprising a Group VIB soluble metal complex, a Group VIII soluble metal complex, small amounts of a Group VB soluble metal complex and ammonium sulfate (amsul); treating the pressure leach solution by chemical precipitation and performing a liquid-solid separation step to generate a first effluent stream containing less than 600 ppm of the Group VIB metal, less than 400 ppm of the group VIII metal, less than 100 ppm of the Group VB metal, less than 480,000 ppm of amsul and a solid residue containing at least 97% of incoming VIB metal and over 80% of incoming group VIII metal.

In another aspect, the method further comprises repulping the solid residue containing at least 97% of incoming VIB metal and over 80% of incoming group VIII metal with acidic water having a pH in the range of 2-3.5 and temperature between 60-90° C., performing a liquid-solid separation step and recovering the second effluent to add to the first effluent stream forming a combined effluent stream. In another aspect, the solids recovered from the liquid-solid separation step are digested in warm ammonia solution to form product that can be routed to catalyst synthesis.

DETAILED DESCRIPTION

Figure 1:
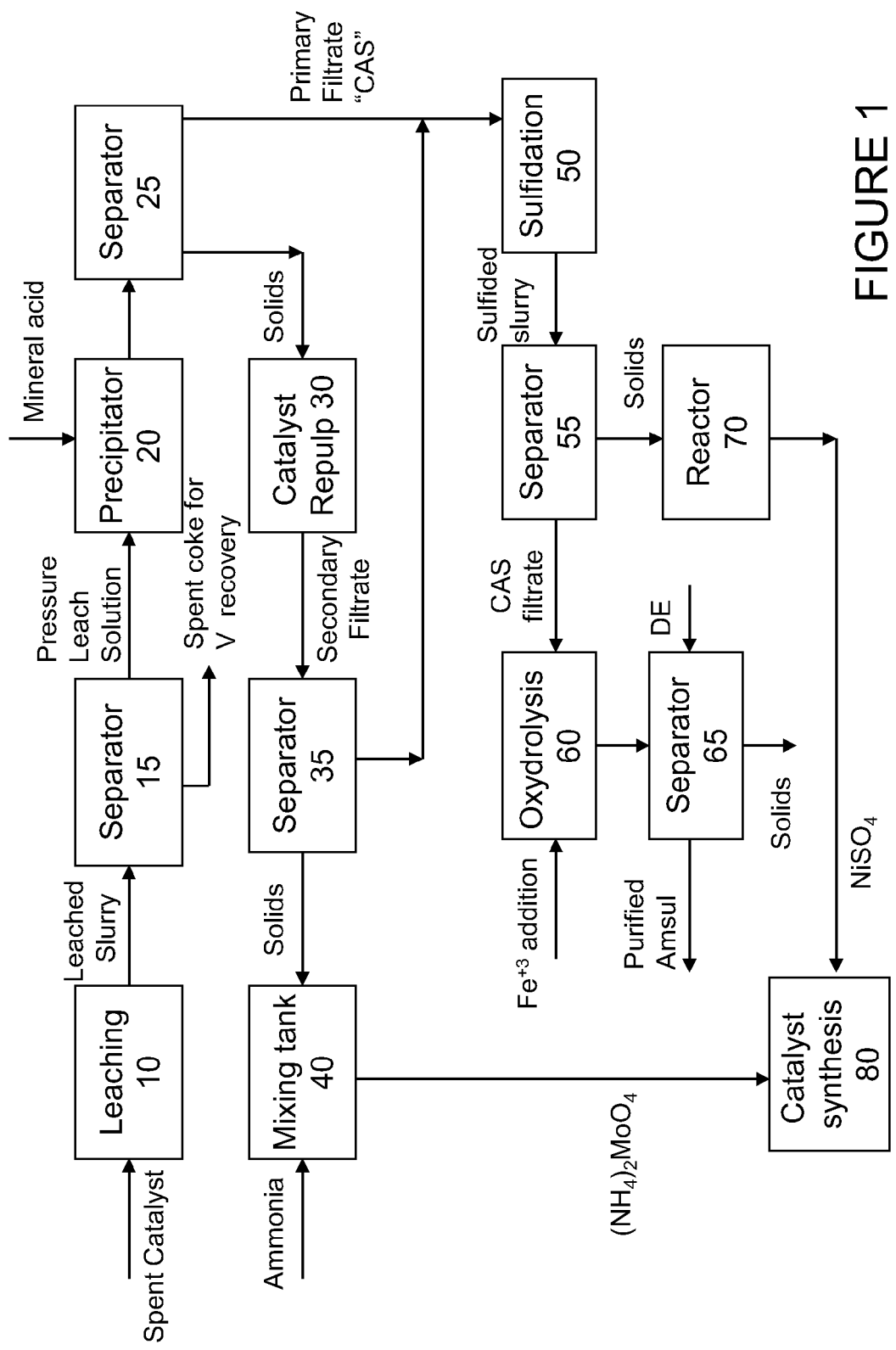
FIG. 1 is a block diagram illustrating one embodiment of a process to recover metals from spent catalyst.

The following terms will be used throughout the specification and will have the following meanings unless otherwise indicated.

"ppm" refers to parts per million. One ppm is equivalent to 1 mg per liter.

"gpL" refers to gram per liter.

As used herein, the term "aerated" refers to the natural and/or mechanical methods of mixing air and water. Any suitable mechanical aeration device can be used.

Suitable devices are described in U.S. Pat. Nos. 3,142,639 and 4,695,379, the references are including herein by reference.

The Periodic Table referred to herein is the Table approved by IUPAC and the U.S. National Bureau of Standards, an example is the Periodic Table of the Elements by Los Alamos National Laboratory's Chemistry Division of October 2001.

"Spent catalyst" refers to a catalyst that has been used in a hydroprocessing operation and whose activity has thereby been diminished. For example, if a reaction rate constant of a fresh catalyst at a specific temperature is assumed to be 100%, the reaction rate constant for a spent catalyst temperature is 80% or less in one embodiment, and 50% or less in another embodiment. In one embodiment, the metal components of the spent catalyst comprise at least one of Group VB, VIB, and VIII metals (of the Periodic Table), e.g., vanadium (V), molybdenum (Mo), tungsten (W), nickel (Ni), and cobalt (Co). The most commonly encountered metal to be recovered is Mo. In one embodiment, the spent catalyst contains sulfides of Mo, Ni, and V.

A reference to "metal" or "metal components" to be recovered in a spent catalyst includes metals in its elemental form, as metal compounds, or metal complexes thereof.

The reference to Mo or "molybdenum" is by way of exemplification only a Group VIB metal, and not intended to exclude other Group VIB metals/compounds and mixtures of Group VIB metals/compounds. Similarly, the reference to "nickel" is by way of exemplification only for a Promoter metal in a hydroprocessing catalyst, and is not meant to exclude other Promoter Metals, i.e., group VIII non-noble metal components; Group VIIIB metals; Group VIB metals; Group IVB metals; Group IIB metals and mixtures thereof that can be used in hydroprocessing catalysts.

The reference to "vanadium" is by way of exemplification only for any Group VB metal component that may be present in spent catalysts, and is not intended to exclude other Group VB metals/compounds and mixtures that may be present in the spent hydroprocessing catalyst for metal recovery.

The reference to "incoming molybdenum" (or "incoming nickel," or "incoming vanadium," etc.) refers to the amount of metal that is initially present in the spent catalyst prior to the metal recovery process.

Spent Catalyst for Metal Recovery:

In one embodiment, the spent catalyst originates from a bulk unsupported Group VIB metal sulfide catalyst optionally promoted with at least a Promoter Metal selected from a Group VB metal such as V, Nb; a Group VIII metal such as Ni, Co; a Group VIIIB metal such as Fe; a Group IVB metal such as Ti; a Group IIB metal such as Zn, and combinations thereof. Promoter Metals are typically added to a catalyst formulation to improve selected properties, or to modify the catalyst activity and/or selectivity. In another embodiment, the spent catalyst originates from a dispersed (bulk or unsupported) Group VIB metal sulfide catalyst promoted with a Group VIII metal for hydrocarbon oil hydroprocessing. In another embodiment, the spent catalyst originates from a Group VIII metal sulfide catalyst. In yet another embodiment, the spent catalyst originates from a catalyst consisting essentially of a Group VIB metal sulfide. In one embodiment, the spent catalyst originates from a bulk catalyst in the form of dispersed or slurry catalyst. In another embodiment, the bulk catalyst is a colloidal or molecular catalyst.

Further details regarding the catalyst wherefrom the spent catalyst originates are described in a number of publications, including US Patent Publication Nos. US20110005976A1, US20100294701A1, US20100234212A1, US20090107891A1, US20090023965A1, US20090200204A1, US20070161505A1, US20060060502A1, and US20050241993A1, the relevant disclosures with respect to the catalyst are included herein by reference.

The bulk catalyst in one embodiment is used for the upgrade of heavy oil products as described in a number of publications, including U.S. Pat. No. 7,901,569, U.S. Pat. No. 7,897,036, U.S. Pat. No. 7,897,035, U.S. Pat. No. 7,708,877, U.S. Pat. No. 7,517,446, U.S. Pat. No. 7,431,824, U.S. Pat. No. 7,431,823, U.S. Pat. No. 7,431,822, U.S. Pat. No. 7,214,309, U.S. Pat. No. 7,390,398, U.S. Pat. No. 7,238,273 and U.S. Pat. No. 7,578,928; US Publication Nos. US20100294701A1, US20080193345A1, US20060201854A1, and US20060054534A1, the relevant disclosures are included herein by reference.

Prior to metal recovery and after the heavy oil upgrade, the spent catalyst in one embodiment undergoes treatment for the removal of hydrocarbons such as oil, precipitated asphaltenes, other oil residues and the like. The spent catalyst prior to deoiling contains carbon fines, metal fines, and (spent) unsupported slurry catalyst in unconverted resid hydrocarbon oil, with a solid content ranging from 5 to 50 wt. %. In one embodiment, the treatment is a deoiling process which may include the use of solvent for oil removal, and a subsequent liquid/solid separation step for the recovery of deoiled spent catalyst. In another embodiment, the treatment process further includes a thermal treatment step, e.g., drying and/or pyrolizing, for removal of hydrocarbons from the spent catalyst. In yet another embodiment, the deoiling is with the use of a sub-critical dense phase gas, and optionally with surfactants and additives, to clean/remove oil from the spent catalyst.

The spent catalyst after deoiling in one embodiment contains less than 5 wt. % hydrocarbons as unconverted resid. In a second embodiment, less than 2 wt. % hydrocarbons. In a third embodiment, the deoiled spent catalyst has less than 1 wt. % hydrocarbons. The amount of metals to be recovered in the de-oiled spent catalyst depends on the compositional make-up of the catalyst for use in hydroprocessing, e.g., a sulfided Group VIB metal catalyst, a bimetallic catalyst with a Group VIB metal and a promoter Group VIII metal, or a multi-metallic catalyst with at least a Group VIB and at least a Promoter metal. In one embodiment, after the oil removal process, the spent catalyst containing metals for recovery is in the form of a coke-like material, which can be ground accordingly to a particle size ranging from 0.01 to about 100 microns for the subsequent metal recovery process.

The deoiling or removal of hydrocarbons from spent catalyst is disclosed in a number of publications, including U.S. Pat. No. 7,790,646, U.S. Pat. No. 7,737,068, WO20060117101, WO2010142397, US20090159505A1, US20100167912A1, US20100167910A1, US20100163499A1, US20100163459A1, US20090163347A1, US20090163348A1, US20090163348A1, US20090159505A1, US20060135631A1, and US20090163348A1, the relevant disclosures are included herein by reference.

Metal Recovery:

After de-oiling, the deoiled catalyst is leached, and subsequently undergoes chemical precipitation to generate a supernatant containing ammonium sulfate (Amsul) and less than 1,000 ppm of Group VIB & Group VIII heavy metals such as molybdenum and nickel. The supernatant is further purified of residual heavy metals via single pH sulfidation, followed by a combination of oxydrolysis and iron precipitation.

In one embodiment, the deoiled catalyst first undergoes a pressure leaching process, wherein ammonia and air are supplied to induce a leaching reaction. Ammoniacal metal leaching is described in U.S. Pat. Nos. 7,737,068; 7,658,895; 7,846,404; and 7837960; and US Patent Publication No. US 2007/0025899, the relevant disclosures are included herein by reference. In one embodiment, the spent catalyst is first caustic leached under atmospheric pressure according to U.S. Pat. No. 6,180,072 before pressure leaching.

In one embodiment, the deoiled and dried spent catalyst is leached in an autoclave, e.g., a multi-chambered, agitated vessel at a sufficient temperature and pressure, in which ammonia and air are supplied to induce leaching reactions, wherein metals such as Group VIB and Group VIII metals are leached into solution forming soluble metal complexes. Most of the (incoming) group VB metals, e.g., vanadium, in the spent catalyst is oxidized and is precipitated in the solids coke phase (following discharge from the autoclave) and up to 10% of the incoming Group VB metal is leached into solution. For example, for a spent catalyst feed stream containing 0.5 wt. % vanadium, up to 0.050 wt % ends up in the leach solution (based on the total weight of the feed stream).

In one embodiment, vanadium is converted into ammonium metavanadate, molybdenum is converted into molybdate compounds including ammonium orthomolybdate, and portions of nickel and cobalt (if any) are converted into amine complexes, e.g., cobalt amine sulfate, nickel amine sulfate, or the like, thereby being leached. In one embodiment, at least 70 wt % of the group VIB and group VIII metals are leached into solution. In another embodiment, at least 80 wt % of the Group VIIIB metal is leached into solution and in another embodiment at least 90% of the Group VIB metal is leached into solution.

In one embodiment, the leaching is carried out at a pressure proportional to the temperature, e.g., a leach temperature between 120 to 250° C. and autoclave pressure of 0-1200 psig. In another embodiment, the autoclave pressure ranges between 300-800 psig. In one embodiment, the spent catalyst is pressure leached from 60-360 minutes. In another embodiment, the pressure leach is for less than 240 minutes. In one embodiment, the pH of the leach solution is maintained within a range of 9 to 12 with sufficient amounts of ammonia to complex the nickel, molybdenum, vanadium and cobalt (if any). In one embodiment, the molar ratio of ammonia to nickel (plus any cobalt, if present) plus molybdenum plus vanadium is in the range of 20:1 to 30:1. In one embodiment, the free ammonia concentration is maintained at >1 wt %, and 2-7 wt % in another embodiment.

The leach slurry is subject to liquid-solid separation via methods known in the art, e.g., settling, centrifugation, decantation, or filtration using a vertical type centrifugal filter or a vacuum filter or a plate and frame filter, and the like, generating a liquid stream (Pressure Leach Solution stream, Pregnant Leach Solution, or PLS) containing the group VIB and VIII metal complexes together with ammonium sulfate (Amsul), ammonium sulfamate and a small amount of group VB metal complexes (up to 10 wt % of the incoming group VB metal), and a solid residue comprising coke and group VB metal complexes (up to 90 wt % of the incoming group VB metal), e.g., ammonium salts of vanadium such as ammonium metavanadate ($NH_4VO_3$) and coke.

In one embodiment, liquid-solid separation is carried out in a filtration device, giving a filter cake containing $NH_4VO_3$ precipitate and coke as solid residue, and a Pressure Leach Solution containing ammonium molybdate, nickel amine sulfate, ammonium metavanadate, ammonium sulfamate and ammonium sulfate having a pH ranging from 8 to 11. In one embodiment, the filter cake contains about 35-65 wt. % solids. In another embodiment, the filter cake contains 45-55 wt. % solids. In one embodiment, the liquid (filtrate or PLS "pregnant leach solution") contains 10 to 100 gpL (grams per liter) molybdenum, 1 to 20 gpL nickel, 0.05 to 2.0 gpL vanadium, and 50 to 1000 gpL ammonium sulfate ("Amsul"). In a second embodiment, the filtrate contains 20 to 100 gpL molybdenum, 5 to 20 gpL nickel, 0.10 to 1.0 gpL vanadium, 8 to 40 gpL ammonium sulfamate and 100 to 500 gpL ammonium sulfate.

In one embodiment after the leaching reaction, the PLS is treated to further reduce the concentration of the group VIB heavy metals such as molybdenum to less than 600 ppm. In one embodiment, the pH of the PLS is controlled to a level at which selective precipitation of the metal complexes occurs ("pre-selected pH"), e.g., precipitation of at least 90% of the Group VIB metal, at least 80% of the Group VIII metal, and at least 40% of the Group VB metal initially present prior to the precipitation process. In one embodiment, about 50-80% of the vanadium leached into the PLS is recovered with the Mo—Ni precipitate with the rest remaining in solution. In yet another embodiment, up to 90% of the vanadium in solution can be recovered in the sulfidation step used to additionally precipitate molybdenum and nickel remaining in solution.

In one embodiment, an acid is employed to adjust the pH of the Pressure Leach Solution to a level at which precipitation of the metal complexes occurs. The acids used to precipitate the metal complexes include any inorganic mineral acid with a relatively high ionization constant. In one embodiment, the acid is used in a strength ranging from 0.2 to 12.0 normal. In another embodiment, the acid is selected from the group of sulfuric acid, hydrochloric acid, phosphoric acid, nitric acid, and the like.

In one embodiment, the precipitation is carried out under mixing conditions at a temperature in the range of 35 to 95° C., a pH range of 2 to 6, and for a sufficient amount of time, e.g., for at least 1 hour, for at least 90% of the molybdenum and 80% nickel in the PLS to precipitate out as metal complexes. In another embodiment, the precipitation is carried out at a temperature of 60-90° C. and a pH range of between 2.5 and 3.5. In one embodiment, at least 95% of the molybdenum precipitates out after 2 hours as a molybdenum compound such as ammonium octamolybdate. In another embodiment, at least 80% of the nickel precipitates out with the molybdenum as a double salt of nickel sulfate and ammonium sulfate.

In one embodiment, the pH of the PLS is continuously regulated for at least part of the precipitation step with the continuous addition of the additive, e.g., mineral acid, to control the rate of the precipitation as well as the type of metal complexes precipitating from the PLS. In one embodiment, a sufficient amount of sulfuric acid (20-100% by weight) is used to adjust the pH of the PLS to less than 6. In another embodiment, a sufficient amount of sulfuric acid is added to the PLS to target a pH of 2.5-3.5, with the mixture being maintained at a temperature of 75-85° C. until 99% of the molybdenum precipitates out as molybdate compounds.

After precipitation, the solid precipitate is separate from solution by known means including settling, filtration, decantation, centrifugation etc., or combinations thereof, generating an effluent stream or primary filtrate (also referred to as Clarified Amsul stream (CAS)) and an unwashed precipitate. In one embodiment, the CAS contains less than 1000 ppm of soluble heavy metals such as molybdenum, and less than 500 ppm of group VIII metals. In another embodiment, the CAS contains less than 1,000 ppm total heavy metals such as Mo, V, Ni, Cr, and the like. The amount of Amsul is less than 1000-gpL in one embodiment; less than 800-gpL in a second embodiment; less than 500-gpL in a third embodiment; and less than 400 gpL in a fourth embodiment.

In one embodiment, following solid-liquid separation, the unwashed precipitate contains over 90% of the incoming molybdenum and over 70% of the incoming nickel. In another embodiment, over 97% of the incoming molybdenum and over 80% of the nickel is recovered in the unwashed precipitate. In one embodiment, the unwashed precipitate contains 25-50 wt % Mo, 2 to 10 wt % Ni, less than 0.5 wt % V, less than 30 wt % Amsul, 1 to 10 wt % S, with a Mo to Ni ratio ranging from 5:1 to 25:1. In yet another embodiment, the unwashed precipitate contains up to 35 wt % Mo, 6 wt % Ni, less than 0.05 wt % V and about 28 wt % amsul.

In one embodiment, after liquid-solid separation, the precipitate is optionally washed with hot acidic water, e.g., at 80° C. having a pH in the range of 2 to 3, to remove Amsul and the double salt of nickel sulfate and ammonium sulfate that may be entrained in the precipitate. In one embodiment, the acidic water temperature is in the range of 60-90° C. In one embodiment, a sufficient amount of acidic water is added to "repulp" the filter cake to a slurry density of 20-40 wt. % solids. After repulping, liquid-solid separation is performed to recover the acidic wash water filtrate ("secondary filtrate") from the solids phase. In one embodiment, the acidic secondary filtrate is added to the primary filtrate CAS as feed to the sulfidation step for additional recovery of heavy metals such as Mo, V and Ni.

In one embodiment after the repulp separation step, the precipitate containing ammonium octamolybdate is dissolved in warm ammoniacal solution, e.g., at a temperature from 50 to 70° C., generating compounds such as $(NH_4)_2MoO_4$ or ammonium molybdate, which can be routed to a catalyst synthesis operation to prepare fresh catalysts.

In one embodiment, during solid-liquid separation of the unwashed precipitate, a chelating agent is added to remove Group VIII compounds such as Ni double salt from the precipitate, obviating the repulping step for additional metal recovery. Examples of chelating agents include but are not limited to formic acid, acetic acid, propionic acid, maleic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids such as benzoic acid. In one embodiment, the chelating agent is added to the wash water employed in the filtration process. In one embodiment, the wash water contains 1-20 wt. % of a chelating agent such as maleic acid, with the pH in the range of 1.5 and 5. In another embodiment, the wash water contains 5-15 wt. % of the chelating agent. In yet another embodiment, a sufficient amount of chelating agent is added to the wash water to have a pH in the range of 2-6. In one embodiment, the wash water containing the chelating agent is heated up to a temperature ranging from 40 to 90° C. In another embodiment, the wash water temperature is between 50-80° C.

Further Removal of Heavy Metals from the CAS:

In one embodiment, the pH of the CAS (plus any acidic filtrate from the optional steps of repulping and filtering the mixed metal cake) is adjusted during a sulfidation step to further precipitate the residual metals in the CAS as metal sulfides.

In one embodiment, the pH is maintained at a range between 6 and 7 at a temperature of 50-100° C., following which a precipitate of Mo, Ni, and V sulfides is obtained. In another embodiment with cobalt being used as a promoter group VIII metal, since cobalt precipitation increases with increasing solution pH, the pH is adjusted upward to 12 to precipitate more than 95% of the cobalt remaining in the CAS.

In one embodiment, a water soluble sulfide-containing compound, e.g., water soluble sulfides, a water soluble polysulfide, or mixtures thereof, is added to the CAS for precipitating residual metals. In another embodiment, the water soluble sulfide-containing compound ("sulfiding agent") is selected from the group of hydrogen sulfide, ammonium sulfide, NaHS, or $Na_2S$, or mixtures thereof. In yet another embodiment, hydrogen sulfide is used in an amount of about 0.05 to 0.2 molar to precipitate out nickel, molybdenum, and the like from the CAS. In another embodiment, hydrogen sulfide gas at an overpressure of 6-psig is used to precipitate out the metals in the sulfidation vessel.

After the sulfidation step, the slurry stream in one embodiment is depressurized through a flash drum with baffle trays to lower the soluble free $H_2S$ content to less than 60 ppm. The sulfided slurry is next sent to a separator to isolate the solids containing residual metal sulfides from the CAS. Separation can be carried out by means known in the art including settling, filtration, decantation, centrifugation, etc., or combinations thereof. The solids containing precipitated metal sulfides, e.g., nickel sulfide, are sent to a holding tank for subsequent dissolution. The supernatant or filtrate still contains less than 100 ppm of soluble heavy metals such as molybdenum and vanadium.

In one embodiment, the solids containing primarily nickel sulfide are oxidized in a pressurized reactor with air sparging at about 150-180° C., at a pressure of 100-200 psig for several hours, prior to the solubilized product being sent to a catalyst synthesis unit. In another embodiment, the filtered solids are first washed with water to remove adhering Amsul and soluble sulfides and then repulped to a density of 10-40 wt. % solids. The repulped NiS is next acidified to a pH ranging from 4 to 6 before pressure leaching with air for conversion into nickel sulfate. In one embodiment, the complete conversion from NiS solids to nickel sulfate occurs after 2-5 hours with the product solution at an acidic pH of <2.

Oxydrolysis and Iron Scavenging:

In one embodiment, the supernatant or filtrate from the separator is pumped to a reactor for oxidation of soluble free sulfides, hydrolysis of residual ammonium sulfamate to amsul and precipitation of residual heavy metals. The filtrate or supernatant, containing primarily amsul, is first adjusted to a pH value at which selective precipitation of the residual heavy metal complexes occurs ("pre-selected pH") with the addition of at least ferric ion at pre-selected temperature and oxidizing means, wherein oxydrolysis takes place. Oxydrolysis refers to the circuit wherein two reactions occur: 1) the hydrolysis of sulfamate, and 2) the oxidation of soluble free sulfides. The oxydrolysis and iron scavenging in one embodiment is carried out at a temperature in the range of 150-400° C., and a pressure of 200-600 psig in the presence of injected air. In another embodiment, iron scavenging with ferric ion addition is performed after the oxydrolysis step.

In one embodiment, the Amsul solution following oxydrolysis (e.g. devoid of free sulfides and sulfamate) is depressurized and cooled down to a temperature of between 60 and 90° C. followed by the addition of ferric ion and maintained at the pre-selected pH for at least forty five minutes.

In one embodiment, the pre-selected pH is between 4 and 8. In another embodiment, between 4 and 7. In a third embodiment, the pH is set between 4.5 and 5.5. The pH adjustment can be accomplished by the addition of at least an acid with a relatively high ionization constant, e.g. sulfuric acid, hydrochloric acid, phosphoric acid, nitric acid, and the like. In one embodiment, the acid is used in a strength ranging from 1.0 to 12.0 normal. In one embodiment, sulfuric acid is used in view of its availability and low cost. In another embodiment, sufficient free acid is present in the ferric sulfate to maintain the Amsul solution at the pre-selected pH. In another embodiment, the pH adjustment can be accomplished by the addition of at least a base such as ammonium hydroxide at a strength ranging from 4.0 to 10.0 normal.

In one embodiment, ferric ion in the form of ferric sulfate is added in view of its availability, low cost, and ease of use. In another embodiment, ferric chloride is employed. In yet another embodiment, a divalent metal cation such as ferrous sulfate is added during oxydrolysis that can be subsequently converted to ferric ion.

In one embodiment, an iron additive is introduced in an amount sufficient to provide about 6 to 50 ppm (parts per million) of ferric ion for each ppm of the metal to be removed. By varying the concentration of the additive to heavy metal ions, nearly total removal of dissolved heavy metal ions can be achieved. In one embodiment, at least 50% of the heavy metals can be removed as a precipitate with the rest remaining in solution. In another embodiment, the removal rate is at least 75%. In a third embodiment, the removal rate is 90%. In yet another embodiment, the rate is at least 96%. In one embodiment, the level of Group VIB metals in solution such as Mo is reduced to less than 10 ppm. In another embodiment, a level of 5 ppm or less. In yet another embodiment, the Group VIB metal level is reduced to 1 ppm or less. In one embodiment, the level of Group VB metals in solution such as V is reduced to less than 10 ppm. In another embodiment, a level of 5 ppm or less. In yet another embodiment, the Group VB metal level is reduced to 1 ppm or less.

In one embodiment, oxidizing means such as aeration or an oxidizing agent such as hydrogen peroxide is provided for the oxydrolysis step.

The contact time between the Amsul solution and the ferric iron additive varies depending on factors including but not limited to the size of the equipment and feed flow rate. In one embodiment, the treatment is for at least a retention time of 30 minutes under agitation, aeration, temperature and pressure to enable the formation of the insoluble heavy metal salts together with effecting hydrolysis of sulfamate and oxidation of free sulfides. In another embodiment, the retention time ranges from 30 minutes to 2 hrs. In yet another embodiment, the retention time is for at least an hour. The treatment is at a temperature ranging from 60° C. to 300° C. in one embodiment, from 100 to 250° C. in a second embodiment, and 230° C. in a third embodiment. In one embodiment, the treatment is at a pressure ranging from 100 to 500 psig. In another embodiment the pressure is at 450 psig. The addition of ferric ion promotes scavenging of Group VIB and VB soluble heavy metals such as molybdenum, tungsten, chromium, vanadium, etc., forming insoluble precipitates such as iron molybdate, tungstate, vanadate, and the like. The following reactions are postulated to occur during oxydrolysis and iron precipitation:

Sulfamate hydrolysis: $NH_4NH_2SO_3 + H_2O \rightarrow (NH_4)_2SO_4$

Soluble free sulfide oxidation: $S^{2-} + 2O_2 + 2H^+ \rightarrow H_2SO_4$

Molybdenum precipitation: $2Fe^{+3} + 3MoO_4^{2-} \rightarrow Fe_2(MoO_4)_{3\downarrow(s)}$ Vanadium precipitation:

$Fe^{+3} + VO_3^- + 2OH^- \rightarrow FeVO_4\downarrow_{(s)} + H_2O$ and $2Fe^{+3} + 6VO_3^- \rightarrow 2Fe(VO_3)_{3\downarrow(s)}$ Iron precipitation:

$Fe_2(SO_4)_{3(aq)} + 4H_2O_{(aq)} \rightarrow Fe_2O_3 \cdot Fe_2O_{(s)} + 3SO_{4(aq)}$ $Fe_2(SO_4)_{3(aq)} + 4H_2O_{(aq)} \rightarrow 2FeOOH_{(s)} + 3H_2SO_{4(aq)}$ In one embodiment, air injected into the reactor promotes sulfamate and iron hydrolysis and oxidizes free sulfides in the feed Amsul stream. It is postulated that the iron oxide and oxy-hydroxide precipitates formed assists in adsorbing and co-precipitating the insoluble iron complexes formed with the heavy metals.

In the next step, the slurry stream containing heavy metal precipitate along with any insoluble iron oxides and oxyhydroxides is depressurized and flashed to a temperature of 80° C. or less prior to liquid solid separation.

In one embodiment, the oxydrolysis and iron scavenging steps are performed separately. In one embodiment, the supernatant or filtrate from the separator is pumped to an oxydrolysis tower for oxidation of soluble free sulfides and hydrolysis of residual ammonium sulfamate to Amsul. The oxydrolysis in one embodiment is carried out at a temperature in the range of 200-300° C., and a pressure of 300-500 psig in the presence of injected air. The Amsul solution following oxydrolysis (e.g., devoid of free sulfides and sulfamate) is depressurized and cooled down to a temperature of between 50 and 90° C., followed by the addition of ferric ion and maintained at the pre-selected pH for at least forty five minutes prior to liquid solid separation.

Liquid solid separation can be done by methods and apparatuses known in the art, e.g., via the use of an inclined plate settler. The metal precipitate in one embodiment may be slime-like in character. In another embodiment, the precipitate may be in the form of suspended matter as fine particulates. In one embodiment, the liquid solid separation is achieved via "body feed" or addition of a material such as calcium silicate or diatomaceous earth or cellulose. In one example, the slurry containing the insoluble metal complexes is body fed with 1,000-20,000 ppm of diatomaceous earth. The diatomaceous earth provides a matrix for agglomerating the fine particulates together, assisting solids settling through the use of an inclined plate settler. In one embodiment, the inclined plate clarifier overflow stream at an Amsul concentration of 10-40 wt % contains less than 10 ppm each of heavy metals such as soluble Mo, Ni, V, etc. In another embodiment, the clarifier overflow contains less than 5 ppm each of heavy metals. The purified amsul can be used as a fertilizer meeting industry grade specifications. Clarifier solids containing iron, diatomaceous earth or cellulose, etc. and low levels of Mo, V, etc., can be shipped off-site to a metals reclaimer, or recycled to the front end of the circuit for metals recovery via ammoniacal pressure leaching with spent catalyst.

Reference will be made to FIG. 1 which is a block flow diagram schematically illustrating an embodiment of a process to recover metals from spent hydroprocessing catalyst. The process as shown comprises of a number of processing steps, with one or more of the steps operating in a batch flow mode, a sequential mode, or a continuous flow mode having a continuous or periodic inflow of feed.

Deoiled spent catalyst is first leached in autoclave 10, e.g., a multi-chambered, agitated vessel, in which ammonia and air are supplied to induce leaching reactions. After leaching, the leach slurry is depressurized and subject to a liquid-solid separation step 15, generating a solid residue containing coke and ammonium metavanadate ($NH_4VO_3$). The PLS stream removed from separator 15 is subsequently subject to precipitation step 20 with the addition of a strong mineral acid to adjust the pH. The slurry generated from the acid precipitation step undergoes liquid-solid separation in step 25, generating a residue, which is subjected to a hot acid re-pulp step 30, and a primary filtrate (CAS). The slurry after acid-repulp is subject to a liquid-solid separation step 35, generating a purified ammonium octamolybdate filter cake. The cake may be dissolved with dilute ammonia in mixing tank 40, yielding ammonium molybdate that can be used in a catalyst synthesis step 80. The filtrate from separator 35 can be added to the primary filtrate as feed to the sulfidation reactor 50.

The sulfided slurry discharge from sulfidation reactor 50 is first depressurized (not shown) then sent to separation zone 55. The filtered solids containing NiS is pressure leached with air in reactor 70, for conversion into $NiSO_4$, which can be sent to a catalyst synthesis unit 80. The filtrate or Clarified Amsul stream (CAS) is fed to a stirred tank reactor 60 that is dosed with $Fe^{+3}$ ion. In one embodiment (not shown), air is injected to promote soluble free sulfides oxidation together with sulfamate and iron hydrolysis and reaction. After depressurization (not shown), the discharged slurry stream is sent to separator 65, where diatomaceous earth ("DE") or cellulose is added to assist in the separation. The clarified discharge Amsul stream with less than 5 ppm of heavy metals may be used as fertilizer. The iron solids, containing minor amounts of base metals, can be sent off-site for metals recovery, or recycled (not shown) to the leach step 10.

Figure 2:
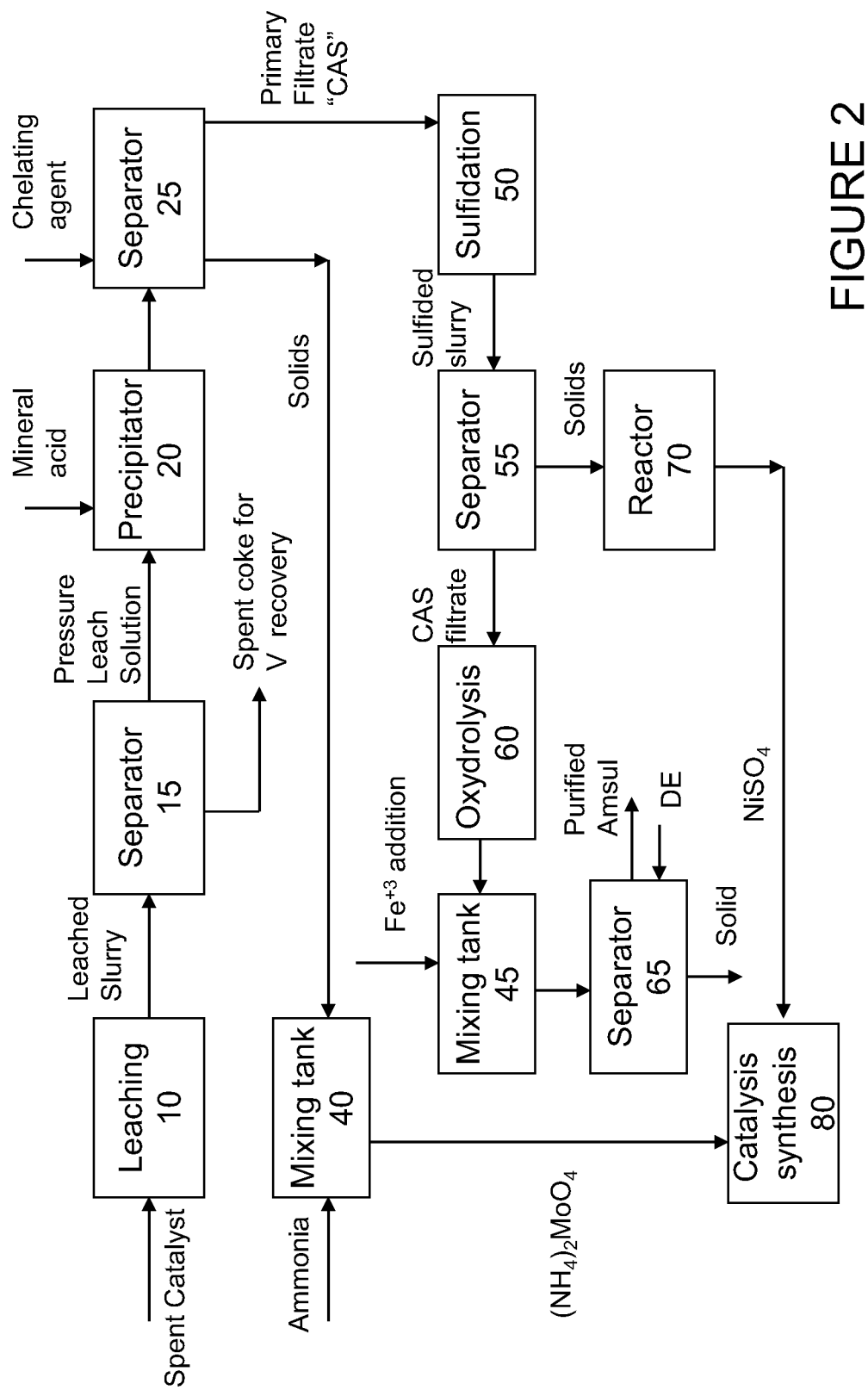
FIG. 2 is a block diagram illustrating another embodiment of a process to recover metals from spent catalyst, wherein oxydrolysis and iron addition are performed as separate steps, and wherein a chelating agent is used in the removal of Group VIII compounds from the precipitate.

FIG. 2 is a block flow diagram schematically illustrating other embodiments to recover metals from spent hydroprocessing catalyst. In one embodiment as shown, CAS filtrate from separator 55 is first sent to oxydrolysis tower 60 for oxidation of soluble free sulfides and hydrolysis of residual ammonium sulfamate to Amsul. The solution is depressurized and cooled (not shown) prior to the addition of ferric iron in stirred tank reactor 45. The discharged slurry stream is sent to separator 65 as shown in the previous Figure. In one embodiment as shown, at least a chelating agent is added to the wash water in the filtration step 25, for the removal of Group VIII compounds such as Ni double salt from the precipitate, obviating the need for repulping the precipitate. The precipitate containing ammonium octamolybdate can be dissolved with dilute ammonia in mixing tank 40, yielding ammonium molybdate that can be used in a catalyst synthesis step 80.

EXAMPLES

The following illustrative examples are intended to be non-limiting.

Example 1

A Ni-Mo slurry catalyst as described in U.S. Pat. Nos. 7,737,072 and 7,737,073 was used in a heavy oil upgrade process as described in U.S. Pat. No. 7,390,398. The spent catalyst underwent a deoiling step similar to the procedures described in U.S. Pat. No. 7,790,646, generating a deoiled solids coke product containing metal sulfides. The coke containing appreciable quantities of Mo, Ni, and V sulfides was subjected to ammoniacal pressure leaching, liquid-solid separation, acidification of the PLS and generation of a filter cake and a primary filtrate under conditions disclosed in U.S. Patent Application Publication Nos. 2007/0025899, 2009/0133536, 2009/0136399 and 2009/10136400. The primary filtrate contains less than 1000 ppm total soluble Mo, Ni, V species and an Amsul content of about 450 gpL.

The filter cake is repulped to between 25 and 35 wt. % solids with hot 80° C. acidified water at pH 2 to 3 for 30 minutes to solubilize entrained ammonium sulfate and permit removal of the soluble double salt of Nickel sulfate and ammonium sulfate. The mixture undergoes solid-liquid separation, generating a purified octamolybdate cake and a secondary filtrate. The secondary filtrate contains low levels of Mo and V (less than 600 ppm total), about 20 gpL Ni and around 100 gpL Amsul. Subsequent to liquid-solid separation, the purified octamolybdate cake is solubilized in ammonia at 60° C. to yield ammonium molybdate and transferred to catalyst synthesis for further processing.

Table 1 shows the concentration of heavy metals in the filter cake prior to and following repulping and the amount of heavy metals dissolved into the filtrate. There is minimal leaching of Mo & V from the Mo—Ni repulped cake with approximately 90% Ni and Amsul dissolution. The increase in concentration of Mo in the washed solids is a consequence of removal of most of the Ni and Amsul from the cake.

TABLE 1

|  | Mo | Ni | V | Amsul |
| --- | --- | --- | --- | --- |
| Unwashed Filter Cake (wt %) | 24 | 3 | 0.05 | 27 |
| Washed Filter Cake (wt %) | 57 | 0.8 | 0.1 | 6.3 |
| Filtrate (% dissolution) | 0.2 | 90 | 8 | 90 |

The combined primary and secondary filtrate stream containing about 530 ppm Mo, 55 ppm V, 5.6 gpL Ni and 365 gpL Amsul is sent to a sulfidation reactor operating at 40 kPag (6 psig) $H_2S$ overpressure and a temperature of 80° C. for 1 hr., resulting in Ni removal to less than 2 ppm, and with soluble Mo and V in the Amsul stream of less than 100 ppm. Table 2 depicts metal removal efficiencies.

TABLE 2

| Feed Type | $H_2S$ Overpressure Kpa | Temp (° C.) | Rxn Time (min) | pH |
| --- | --- | --- | --- | --- |
| Primary + Secondary Filtrate | 40 (~6 psig) | 80 | 60 | 6.5 |

| Mo | Ni | V | Mo | Ni | V |
| --- | --- | --- | --- | --- | --- |
| Sulfidation Head (ppm) | | | Sulfidation Tail (ppm) | | |
| 530 | 5,600 | 55 | 78 | <2 | 15 |

The hot sulfided slurry discharge is depressurized through a flash drum with baffle trays, to lower soluble free $H_2S$ content to <60-ppm, and then fed to a clarifier unit. The clarifier underflow is pumped to a filter press with the filtered solids being washed with fresh water to remove any adhering Amsul and soluble sulfides; the washed solids are then repulped to a density of ~20-wt % solids. The repulped NiS slurry is acidified to a pH~5, and introduced into a reactor for pressure leaching with air at 165° C. and a total pressure of 1,100 kPag (160-psig). Complete conversion of the NiS solids into nickel sulfate occurs within 3-hours with the product solution at an acidic pH of less than two.

The clarifier overflow stream containing less than 100-ppm soluble metals and 365-gpL amsul is feed to a stirred tank reactor at 230° C. and 450-psig. The reactor is dosed with 2000-ppm $Fe^{+3}$ (as ferric sulfate) ion, with the pH being maintained around 5 with ammonia or sulfuric acid for 60-minutes. Air is injected to promote sulfamate and iron hydrolysis, and oxidize free sulfides in the Amsul stream. The iron oxides and oxy-hydroxide precipitate formed adsorbs and co-precipitates insoluble iron complexes of Mo and V. Table 3 portrays oxydrolysis and iron scavenging conditions and metal removal levels.

TABLE 3

| Feed Type | $Fe^{+3}$ (ppm) | Temp (° C.) | Pressure (psig) | Rxn Time (min) | pH |
| --- | --- | --- | --- | --- | --- |
| Oxydrolysis Feed | 2,000 | 230 | 450 | 60 | 5 |

| Mo | Ni | V | Mo | Ni | V | Fe |
| --- | --- | --- | --- | --- | --- | --- |
| Oxy/Fe Precipitation Head (ppm) | | | Oxy/Fe Precipitation Tail (ppm) | | | |
| 75 | <1 | 15 | <1 | <1 | <1 | 1 |

The discharge slurry stream is depressurized and flashed to 80° C., then body fed with up-to 10,000-ppm of diatomaceous earth to assist in solids settling through a lamella inclined plate clarifier. The clarifier overflow stream at ~34-wt % Amsul concentration contains less than 5-ppm each of soluble Mo, Ni and V.

For purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. It is noted that, as used in this specification and the appended claims, the singular forms "a," "an," and "the," include plural references unless expressly and unequivocally limited to one referent. The use of "including," "comprising," or "having," "containing," "involving," and variations thereof herein, is meant to encompass the items listed thereafter and equivalents thereof as well as additional items.

This description uses examples to disclose the invention, including the best mode, and also to enable any person skilled in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for recovering metals from a spent catalyst, the method comprising:
   leaching a Group VIB metal, a Group VIII metal, and a Group VB metal, from the spent catalyst with an ammonia containing leach solution at a temperature and a pressure sufficient to form a pressure leach slurry;
   separating and removing a solid residue from the pressure leach slurry to form a pressure leach solution comprising a Group VIB soluble metal complex and a Group VIII soluble metal complex;
   treating the pressure leach solution by chemical precipitation to precipitate at least a portion of the Group VIB metal and at least a portion of the Group VIII metal as precipitated metal complexes;
   recovering the precipitated metal complexes by at least a separation means selected from settling, filtration, decantation, centrifugation and combinations thereof, forming a first effluent stream containing less than 600 ppm of the Group VIB metal and less than 400 ppm of the group VIII metal and a solid residue containing at least 97% of incoming VIB metal and over 80% of incoming Group VIII metal;
   sulfiding the first effluent stream with a sulfiding agent to form a sulfided slurry comprising a Group VB metal sulfide and/or oxide, a Group VIB metal sulfide and a Group VIII metal sulfide;
   separating and removing the Group VB metal sulfide and/or oxide, the Group VIB metal sulfide and the Group VIII metal sulfide from the sulfided slurry, forming a second effluent stream comprising a Group VB and a Group VIB soluble metal compound;
   contacting the second effluent stream with an effective amount of ferric ion at a pre-selected pH for the ferric ion to form a complex with the Group VB and Group VIB metal;
   performing a liquid-solid separation to remove the Group VB and Group VIB metal complex as solids, forming a third effluent containing less than 5 ppm of the Group VB metal and less than 5 ppm of the Group VIB metal.

2. The method of claim 1, wherein the contact with ferric ion is carried out at a sufficient temperature and pressure with aeration for oxydrolysis to take place.

3. The method of claim 2, wherein the contact with ferric ion is at a pre-select pH between 4.0 and 8.0.

4. The method of claim 2, wherein the pre-selected pH is between 4.5 and 5.5.

5. The method of claim 2, wherein the contact during oxydrolysis is at a temperature between 150-300° C.

6. The method of claim 2, wherein the contact during oxydrolysis is at a pressure of 300-600 psig.

7. The method of claim 1, wherein the precipitated metal complexes are recovered by filtration and water washed, and wherein the wash water comprises at least a chelating agent.

8. The method of claim 7, wherein the wash water has pH ranging from 1.5 to 5.0, and wherein the wash water contains 1-20 wt. % of a chelating agent.

9. The method of claim 7, wherein the chelating agent is selected from the group consisting of formic acid, acetic acid, propionic acid, maleic acid, fumaric acid, succinic acid, tartaric acid, citric acid, oxalic acid, glyoxylic acid, aspartic acid, alkane sulfonic acids, aryl sulfonic acids, arylcarboxylic acids and mixtures thereof.

10. The method of claim 1, further comprising repulping the solid residue with acidic wash water.

11. The method of claim 10, wherein the solid residue is repulped with acidic wash water having a pH in the range of 2.0 to 3.0.

12. The method of claim 10, wherein the solid residue is repulped with a sufficient amount of water for a slurry density of 20-40 wt. % solids.

13. The method of claim 10, further comprising separating and removing the solid residue to recover the wash water as a filtrate.

14. The method of claim 13, further comprising adding the wash water filtrate to the first effluent stream for sulfidation with the sulfiding agent to form the sulfided slurry.

15. The method of claim 1, wherein the second effluent stream is brought in contact with an effective amount of ferric ion for at least 50% of the Group VB metal and at least 50% of the Group VIB metal to be removed by forming an insoluble complex with the ferric ion.

16. The method of claim 15, wherein the second effluent stream is brought in contact with an effective amount of ferric ion for at least 75% of the Group VB metal and at least 75% of the Group VIB metal to be removed by forming an insoluble complex with the ferric ion.

17. The method of claim 16, wherein the second effluent stream is brought in contact with an effective amount of ferric ion for at least 90% of the Group VB metal and at least 90% of the Group VIB metal to be removed by forming an insoluble complex with the ferric ion.

18. The method of claim 1, wherein the second effluent stream is brought in contact with an effective amount of ferric ion for the ferric ion to form insoluble complexes with the Group VB and Group VIB metal and for the Group VB and Group VIB metal in solution to be 5 ppm or less.

19. The method of claim 1, wherein the effective amount of ferric ion ranges from 6 to 50 ppm of metal cation to each ppm of the Group VB and Group VIB soluble metal compounds in the second effluent stream.

20. The method of claim 1, wherein the ferric ion is selected from ferric sulfate, ferrous sulfate and ferric chloride.

21. The method of claim 1, wherein the second effluent stream is set to a pre-selected pH prior to contact with ferric ion by adding sulfuric acid or ammonium hydroxide to the second effluent stream.

22. The method of claim 1, further comprising subjecting the second effluent stream to aeration at a sufficient temperature and pressure for oxydrolysis to take place prior to contacting the second effluent with an effective amount of ferric ion.

23. The method of claim 22, wherein the second effluent stream after oxydrolysis is cooled down to a temperature of less than 100° C. prior to contacting the second effluent stream with an effective amount of ferric ion.

24. The method of claim 23, wherein the second effluent stream after oxydrolysis is cooled down to a temperature of 60-70° C. prior to contacting the second effluent stream with ferric ion.

25. The method of claim 1, wherein the contact with the ferric ion is for a sufficient amount of time for at least 50% of the Group VIB soluble metal to form an insoluble complex with the ferric ion.

26. The method of claim 1, further comprising aerating the second effluent stream while it is in contact with the ferric ion.

27. The method of claim 1, wherein the liquid-solid separation to remove the Group VB and Group VIB insoluble metal complexes is via an inclined plate settler.

28. The method of claim 1, wherein the solids containing the Group VB and Group VIB metal complexes is body fed with at least one of calcium silicate, diatomaceous earth, and cellulose.

29. The method of claim 1, wherein the first effluent stream is sulfided with a sulfiding agent selected from the group consisting of hydrogen sulfide, ammonium sulfide, NaHS, $Na_2S$, and mixtures thereof.

* * * * *